United States Patent
Lai et al.

(10) Patent No.: US 9,670,334 B2
(45) Date of Patent: Jun. 6, 2017

(54) SHEAR THICKENING FORMULATION AND COMPOSITE MATERIAL EMPLOYING THE SAME

(71) Applicant: INDUSTRIAL TECHNOLOGY RESEARCH INSTITUTE, Hsinchu (TW)

(72) Inventors: Wei-Hao Lai, Kaohsiung (TW); Shih-Ming Chen, Hsinchu (TW); Cheng-Yi Lin, Hukou Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/826,838

(22) Filed: Aug. 14, 2015

(65) Prior Publication Data
US 2016/0059195 A1 Mar. 3, 2016

(30) Foreign Application Priority Data
Aug. 26, 2014 (TW) .............................. 103129304 A

(51) Int. Cl.
*C08K 3/34* (2006.01)
*C08K 5/06* (2006.01)
*C08J 5/10* (2006.01)
*C08J 5/24* (2006.01)

(52) U.S. Cl.
CPC ................ *C08K 3/346* (2013.01); *C08J 5/10* (2013.01); *C08J 5/24* (2013.01); *C08K 3/34* (2013.01); *C08K 5/06* (2013.01)

(58) Field of Classification Search
CPC ... C08K 3/346; C08K 3/34; C08K 5/06; C08J 5/10; C08J 5/24
See application file for complete search history.

(56) References Cited

U.S. PATENT DOCUMENTS

| | | |
|---|---|---|
| 5,047,181 A | 9/1991 | Occhionero et al. |
| 5,104,646 A | 4/1992 | Bolich, Jr. et al. |
| 5,106,609 A | 4/1992 | Bolich, Jr. et al. |
| 5,672,297 A | 9/1997 | Soane |
| 5,785,977 A | 7/1998 | Breithbarth |
| 5,801,116 A | 9/1998 | Cottrell et al. |
| 5,885,948 A | 3/1999 | Glenn, Jr. et al. |
| 6,080,707 A | 6/2000 | Glenn, Jr. et al. |
| 6,080,708 A | 6/2000 | Glenn, Jr. et al. |
| 6,500,411 B2 | 12/2002 | SenGupta et al. |
| 6,511,756 B1 | 1/2003 | Obuchi et al. |
| 6,716,418 B2 | 4/2004 | SenGupta et al. |
| 6,870,034 B2 | 3/2005 | Breece et al. |
| 7,226,878 B2 | 6/2007 | Wagner et al. |
| 7,396,545 B2 | 7/2008 | Cheng et al. |
| 7,498,276 B2 | 3/2009 | Wagner et al. |
| 7,825,045 B1 | 11/2010 | Wagner et al. |
| 7,858,835 B2 | 12/2010 | Abuzaina et al. |
| 7,966,937 B1 | 6/2011 | Jackson |
| 8,045,833 B2 | 10/2011 | Wasserman et al. |
| 8,222,166 B2 | 7/2012 | Chu et al. |
| 8,334,336 B2 | 12/2012 | Lux et al. |
| 8,397,641 B1 | 3/2013 | Jackson |
| 8,409,376 B2 | 4/2013 | Boyden et al. |
| 2003/0051413 A1* | 3/2003 | Sakai ....................... C09G 1/02 51/307 |
| 2005/0004318 A1 | 1/2005 | Ohshiro et al. |
| 2005/0266748 A1 | 12/2005 | Wagner et al. |
| 2006/0234577 A1 | 10/2006 | Wagner et al. |
| 2009/0004413 A1 | 1/2009 | Wagner et al. |
| 2009/0255023 A1 | 10/2009 | Williams et al. |
| 2010/0027948 A1 | 2/2010 | Wasserman et al. |
| 2010/0221521 A1 | 9/2010 | Wagner et al. |
| 2010/0269236 A1 | 10/2010 | Wagner et al. |
| 2011/0121223 A1 | 5/2011 | Ulicny et al. |
| 2011/0152064 A1 | 6/2011 | Keshavan et al. |
| 2011/0152068 A1 | 6/2011 | Keshavan et al. |
| 2012/0039824 A1 | 2/2012 | Archer et al. |
| 2012/0186003 A1 | 7/2012 | Heger et al. |
| 2013/0061739 A1 | 3/2013 | Cheong et al. |
| 2013/0209893 A1 | 8/2013 | Archer et al. |

FOREIGN PATENT DOCUMENTS

| | | |
|---|---|---|
| CN | 1182361 A | 5/1998 |
| CN | 1092040 C | 10/2002 |
| CN | 101140151 A | 3/2008 |
| CN | 101220228 A | 7/2008 |
| CN | 101563733 A | 10/2009 |
| CN | 101659791 A | 3/2010 |
| CN | 101817516 A | 9/2010 |
| CN | 101857221 A | 10/2010 |
| CN | 101874811 A | 11/2010 |
| CN | 101941675 A | 1/2011 |
| CN | 102212412 A | 10/2011 |

(Continued)

OTHER PUBLICATIONS

Galindo-Rosales et al., "An apparent viscosity function for shear thickening fluids", Journal of Non-Newtonian Fluid Mechanics, vol. 166, 2011, pp. 321-325.
Hassan et al., "Sonochemical synthesis and rheological properties of shear thickening silica dispersions", Ultrasonics Sonochemistry, vol. 17, 2010, pp. 947-952.
Lee et al., "The ballistic impact characteristics of Kevlar woven fabrics impregnated with a colloidal shear thickening fluid", Journal of Materials Science, vol. 38, 2003, pp. 2825-2833.
Lin et al., "The Mechanism of Shear Thickening Fluid With Nanoparticles Applied to Liquid Armor", Journal of C.C.I.T., vol. 36, No. 2, May 2008, pp. 1-6.
Wagner et al., "Shear thickening in colloidal dispersions", American Institute of Physics, Physics Today, Oct. 2009, pp. 27-32.

*Primary Examiner* — John Uselding
(74) *Attorney, Agent, or Firm* — Birch, Stewart, Kolasch & Birch, LLP

(57) ABSTRACT

A shear thickening formulation and composite material employing the same are provided. The shear thickening formulation includes inorganic particles and polyethylene glycol. The inorganic particles and the polyethylene glycol have a weight ratio of 3 to 4. The inorganic particles can be silica, aluminum oxide, silicon carbide, nano diamond, or a combination thereof.

6 Claims, No Drawings

(56) References Cited

FOREIGN PATENT DOCUMENTS

| | | |
|---|---|---|
| CN | 102220688 A | 10/2011 |
| CN | 102277117 A | 12/2011 |
| CN | 102558662 A | 7/2012 |
| CN | 102702622 A | 10/2012 |
| CN | 102719065 A | 10/2012 |
| CN | 103074762 A | 5/2013 |
| CN | 102212412 B | 10/2013 |
| CN | 103359740 A | 10/2013 |
| CN | 103422341 A | 12/2013 |
| CN | 103505420 A | 1/2014 |
| CN | 103655486 A | 3/2014 |
| TW | 533201 B | 5/2003 |
| TW | 200303234 A | 9/2003 |
| TW | 200400836 A | 1/2004 |
| TW | 200406222 A | 5/2004 |
| TW | 200526274 A | 8/2005 |
| TW | 200539903 A | 12/2005 |
| TW | I282285 B | 6/2007 |
| TW | 200730176 | 8/2007 |
| TW | 200811145 A | 3/2008 |
| TW | 200816987 A | 4/2008 |
| TW | 200831140 A | 8/2008 |
| TW | 200936186 A | 9/2009 |
| TW | I314866 B | 9/2009 |
| TW | 201006509 A1 | 2/2010 |
| TW | 201043271 A1 | 12/2010 |
| TW | 201216505 A1 | 4/2012 |
| TW | 201218416 A1 | 5/2012 |
| TW | 201220471 A1 | 5/2012 |
| TW | 201226479 A1 | 7/2012 |
| TW | I367898 | 7/2012 |
| TW | 201241065 A1 | 10/2012 |
| TW | 201314746 A1 | 4/2013 |
| TW | 201406369 A | 2/2014 |
| TW | I424873 B | 2/2014 |

\* cited by examiner

SHEAR THICKENING FORMULATION AND COMPOSITE MATERIAL EMPLOYING THE SAME

CROSS REFERENCE TO RELATED APPLICATIONS

The present application is based on, and claims priority from, Taiwan Application Serial Number 103129304, filed on Aug. 26, 2014, the disclosure of which is hereby incorporated by reference herein in its entirety.

TECHNICAL FIELD

The technical field relates to a shear thickening formulation and application thereof.

BACKGROUND

The shear thickening material can be applied in impact resistant and protective equipment. It may instantly absorb energy to be hardened to provide protection under high-speed impact. When the energy is released, the shear thickening material may recover to its original state (e.g. a moldable state), such that the shear thickening material can be widely applied in various fields. As such, accelerating the shear thickening rate or enhancing the maximum viscosity of the shear thickening material may improve the protection effect thereof.

Accordingly, developments of the shear thickening formulation with a faster shear thickening rate and protection equipment utilizing the same are important topics.

SUMMARY

One embodiment of the disclosure provides a shear thickening formulation, comprising: inorganic particles; and polyethylene glycol, wherein the inorganic particles and the polyethylene glycol have a weight ratio of 3 to 4, the inorganic particles are silicon oxide, aluminum oxide, silicon carbide, nano diamond, or a combination thereof.

One embodiment of the disclosure provides a composite material, comprising: a matrix; and the described shear thickening formulation.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

Shear thickening formulations and application thereof are disclosed. The shear thickening formulations may achieve their maximum viscosity at low shear rate, such that composite materials including the same may absorb impact energy while being impacted. When an object is wrapped by the composite material of the disclosure, the object can be protected by the impact resistant composite material.

The shear thickening formulations of the disclosure may include inorganic particles and polyethylene glycol (PEG), wherein the inorganic particles and the PEG have a weight ratio of 3 to 4.

In the disclosure, any range between two values includes the two values. For example, the weight ratio of the inorganic particles and the PEG being 3 to 4 means the weight ratio including 3 and 4.

In one embodiment, the inorganic particles (e.g. spherical particles with a Mohs hardness scale of at least 7) can be silicon oxide, aluminum oxide, silicon carbide, nano diamond, or a combination thereof. In one embodiment, the inorganic particles have a diameter of 200 nm to 5000 nm, or about 300 nm to 1000 nm.

In one embodiment, the PEG has a weight average molecular weight (Mw) of about 100 to 6000. A PEG with an overly high Mw may easily solidify the formulation. A PEG with an overly low Mw may reduce the thickening effect, such that the formulation may drain.

The above PEG can be a PEG with an MW value, or a mixture of different PEGs with different MW values. In one embodiment, the PEG includes a first PEG and a second PEG, wherein the first PEG has a MW of about 100 to 400, the second PEG has a MW of about 600 to 2000, and the first PEG and the second PEG have a weight ratio of 1 to 3. An overly high ratio of the first PEG may reduce the thickening effect, and the formulation may drain. An overly low ratio of the first PEG may easily solidify the formulation.

In one embodiment, about 1 to 10 parts by weight of a filler (based on 100 parts by weight of the inorganic particles) can be added into the above shear thickening formulation, wherein the inorganic particles and the filler have a weight ratio of 10 to 100. The filler may enhance the maximum viscosity or reduce the shear rate of the shear thickening formulation, thereby accelerating the thickening effect. An overly high amount of the filler may easily solidify the formulation or reduce the thickening effect of the formulation. An overly low amount of the filler cannot efficiently enhance the thickening effect. The filler can be nanoclay, nanocellulose, or a combination thereof. In one embodiment, the nanoclay has a diameter of 10 nm to 50 nm and a thickness of 0.1 nm to 2 nm. A nanoclay with an overly large diameter or thickness may reduce the thickening property of the shear thickening formulation. A nanoclay with an overly small diameter or thickness cannot efficiently enhance the thickening effect of the shear thickening formulation. In one embodiment, the nanocellulose has a diameter of 1 nm to 200 nm and a length of 0.01 μm to 100 μm. A nanocellulose with an overly large diameter may easily solidify the shear thickening formulation. A nanocellulose with an overly small diameter cannot efficiently enhance the thickening effect of the shear thickening formulation.

The shear thickening formulation of the disclosure may achieve its maximum viscosity at a shear rate of less than or equal to 20 $s^{-1}$. In some embodiment, the shear thickening formulation may achieve its maximum viscosity at a shear rate of less than or equal to 10 $s^{-1}$.

The shear thickening formulation of the disclosure can be applied in various fields if necessary. For example, a composite material utilizing the shear thickening formulation can be utilized in impact resistance, protection, and the like. In one embodiment, a method for preparing the composite material includes: coating the shear thickening formulation of the disclosure onto a matrix (e.g. fiber, fabric, or metal), and pressing the coated matrix at a temperature of 10° C. to 120° C. for 0.05 to 4.5 hours, thereby obtaining a composite with the shear thickening material on a surface of the matrix. Alternately, a method for preparing the composite material includes: impregnating a matrix (e.g. fiber, fabric, or metal) in the shear thickening formulation of the disclosure, stacking the impregnated matrix, and pressing the stack at 60° C. to 100° C. for 0.5 to 4.5 hours, thereby obtaining a composite material with the shear thickening formulation in the matrix. In one embodiment, the fiber includes carbon fiber, glass fiber, or polyamide fiber.

amount (being changed as shown in Table 1). Physical properties of the shear thickening formulations are tabulated in Table 1.

TABLE 1

|  | Silicon oxide (g) | PEG-Mw and amount | Testing temperature (° C.) | Initial viscosity (cps) | Maximum viscosity (cps) | Shear rate ($s^{-1}$) | Silica/PEG ratio |
|---|---|---|---|---|---|---|---|
| Comparative Example 1 | 60 | PEG-200 40 g | 25 | 158 | 1164 | 180 | 1.50 |
| Comparative Example 2 | 70 | PEG-200 30 g | 25 | 439 | 1230 | 58 | 2.33 |
| Example 1 | 76 | PEG-200 24 g | 25 | 37802 | 290078 | 8 | 3.17 |
| Example 2 | 78 | PEG-200 22 g | 25 | 29040 | 294803 | 9 | 3.54 |

*Viscometer: Brookfield HBDV - III

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Shear Thickening Formulation

Example 1

76 g of silicon oxide with an average diameter of about 500 nm (SO-E2 silica, commercially available from Denka Co.), 24 g of polyethylene glycol (PEG, Mw=200, commercially available from Aldrich), and 75 g of ethanol solvent (commercially available from Cheng Chun Plastics Co.) were put into a one-necked glass reactor (500 mL) and then stirred at room temperature for 2 hours to 24 hours. Thereafter, the solvent was removed by vacuum evaporator and the reaction result was concentrated to a shear thickening formulation with physical properties as tabulated in Table 1.

Example 2

Similar to Example 1, and the differences in Example 2 were the silicon oxide amount being changed to 78 g and the PEG amount being changed to 22 g. Physical properties of the shear thickening formulation are tabulated in Table 1.

Comparative Examples 1-2

Similar to Example 1, the differences in Comparative Examples 1-2 were the silicon oxide amount and the PEG As shown in Table 1, the shear thickening formulations in Examples 1 and 2 with silicon oxide and the PEG having a weight ratio of 3 to 4 might achieve the maximum viscosity at a shear rate of 8 $s^{-1}$ to 9 $s^{-1}$. Compared to Comparative Examples 1 and 2, Examples 1 and 2 may largely enhance the fast thickening effect.

Example 3

The physical properties of the shear thickening formulation in Example 1 were tested at 50° C., as shown in Table 2.

Examples 4 and 5

Similar to Example 1, and the differences in Examples 4-5 were the silicon oxide amount, the PEG Mw, and PEG amount (being changed as shown in Table 2). Physical properties of the shear thickening formulations are tabulated in Table 2.

TABLE 2

|  | Silicon oxide (g) | PEG-Mw and amount | Testing temperature (° C.) | Initial viscosity (cps) | Maximum viscosity (cps) | Shear rate ($s^{-1}$) |
|---|---|---|---|---|---|---|
| Example 1 | 76 | PEG-200 24 g | 25 | 37802 | 290078 | 8 |
| Example 3 | 76 | PEG-200 24 g | 50 | 24171 | 24171 | — |
| Example 4 | 76 | PEG-200 12 g PEG-1000 12 g | 25 | 42977 | 320528 | 7 |
| Example 5 | 76 | PEG-200 12 g PEG-1000 12 g | 50 | 37801 | 215760 | 8 |

As shown in Table 2, the mixtures of two PEGs with two Mw values in Examples 4 and 5 made the shear thickening formulations still have fast thickening effect at high temperature.

Examples 6 and 7

Similar to Example 4, and the differences in Examples 6 and 7 were a different amount of nanoclay (Laponite RDS clay, diameter of 25 nm, thickness of 0.92 nm, commercially available from Rockwood Co.) being added into the shear thickening formulations. The nanoclay amount and the physical properties of the shear thickening formulations are tabulated in Table 3.

TABLE 3

|  | Silicon oxide (g) | PEG-Mw and amount | Clay (g) | Testing temperature (° C.) | Initial viscosity (cps) | Maximum viscosity (cps) | Shear rate (s$^{-1}$) |
|---|---|---|---|---|---|---|---|
| Example 4 | 76 | PEG-200 12 g PEG-1000 12 g | 0 | 25 | 42977 | 320528 | 7 |
| Example 6 | 76 | PEG-200 12 g PEG-1000 12 g | 1 | 25 | 60476 | 460479 | 7 |
| Example 7 | 76 | PEG-200 12 g PEG-1000 12 g | 2 | 25 | 183476 | 619245 | 3 |

As shown in Table 3, the nanoclay in Examples 6 and 7 could enhance the maximum viscosity or reduce the shear rate of the shear thickening formulations, thereby accelerating the thickening effect.

Examples 8 to 10

The physical properties of the shear thickening formulations in Examples 4, 6, and 7 were tested at 75° C., as shown in Table 4.

TABLE 4

|  | Silicon oxide (g) | PEG-Mw and amount | Clay (g) | Testing temperature (° C.) | Initial viscosity (cps) | Maximum viscosity (cps) | Shear rate (s$^{-1}$) |
|---|---|---|---|---|---|---|---|
| Example 8 | 76 | PEG-200 12 g PEG-1000 12 g | 0 | 75 | 30961 | 91154 | 9 |
| Example 9 | 76 | PEG-200 12 g PEG-1000 12 g | 1 | 75 | 34389 | 148637 | 8 |
| Example 10 | 76 | PEG-200 12 g PEG-1000 12 g | 2 | 75 | 71568 | 279889 | 4 |

As shown in Table 4, the mixtures of two PEGs with two Mw values in Examples 8 to 10 made the shear thickening formulations still have fast thickening effect at high temperature. In addition, the nanoclay might further enhance the maximum viscosity or reduce the shear rate of the shear thickening formulations, thereby accelerating the thickening effect.

Example 11

Similar to Example 4, and the difference in Example 11 was 4 g of nanocellulose (Celish KY-100G, diameter of 1 nm to 200 nm, length of 0.01 µm to 100 µm, commercially available from FineChem Ltd.) being further added into the shear thickening formulation. Physical properties of the shear thickening formulations were tested, as tabulated in Table 5.

As shown in comparison between Examples 4 and 11 in Table 5, the nanocellulose had a fast thickening effect, and even reduced the shear rate to accelerate the thickening effect.

[Composite Film Materials 1]

Subsequently, the shear thickening formulations in Examples 1 to 11 were coated on polyamide cellulose and then stacked, and then heated to 80° C. to 90° C. and remained at 80° C. to 90° C. for 0.5 to 3 hours to obtain composite film materials for a non-draining test and a flexible test as described below.

[Non-Draining Test]

The above composite film materials were vertically stood for 3 hour to watch the flowability of the coating resulted from gravity. As a result, no draining phenomenon was observed in these composite film materials.

[Flexible Test]

According to rigid-flexible testing for Taiwan police bullet proof clothing, the samples were tested by a cantilever type rigid-flexible tester. A jointing plate and a sample were simultaneously, slowly, and smoothly slipped forward. When the front end of the sample dropped to a height of a slant line, the slipping of the sample was stopped to record the displacement of the back end of the sample. The smaller displacement means the sample has a higher flexibility (a displacement of less than 28 cm is acceptable). The composite film materials were tested as above, and testing results were tabulated in Table 6.

TABLE 5

|  | Silicon oxide (g) | PEG-Mw and amount | Nanocellulose (g) | Testing temperature (° C.) | Initial viscosity (cps) | Maximum viscosity (cps) | Shear rate (s$^{-1}$) |
|---|---|---|---|---|---|---|---|
| Example 4 | 76 | PEG-200 12 g PEG-1000 12 g | 0 | 25 | 42977 | 320528 | 7 |
| Example 11 | 76 | PEG-200 12 g PEG-1000 12 g | 4 | 25 | 86935 | 317863 | 4 |

TABLE 6

| | Silicon oxide (g) | PEG-Mw and amount | Clay or nanocellulose content | Testing temperature (° C.) | Flexible testing results |
|---|---|---|---|---|---|
| Example 1 | 76 | PEG-200 24 g | 0 | 25 | Acceptable |
| Example 2 | 78 | PEG-200 22 g | 0 | 25 | Acceptable |
| Example 3 | 76 | PEG-200 24 g | 0 | 50 | Acceptable |
| Example 4 | 76 | PEG-200 12 g PEG-1000 12 g | 0 | 25 | Acceptable |
| Example 5 | 76 | PEG-200 12 g PEG-1000 12 g | 0 | 50 | Acceptable |
| Example 6 | 76 | PEG-200 12 g PEG-1000 12 g | Clay 1 g | 25 | Acceptable |
| Example 7 | 76 | PEG-200 12 g PEG-1000 12 g | Clay 2 g | 25 | Acceptable |
| Example 8 | 76 | PEG-200 12 g PEG-1000 12 g | 0 | 75 | Acceptable |
| Example 9 | 76 | PEG-200 12 g PEG-1000 12 g | Clay 1 g | 75 | Acceptable |
| Example 10 | 76 | PEG-200 12 g PEG-1000 12 g | Clay 2 g | 75 | Acceptable |
| Example 11 | 76 | PEG-200 12 g PEG-1000 12 g | Nanocellulose 4 g | 25 | Acceptable |

Composite Film Materials 2

Example 12

Carbon fibers (Tairyfil Carbon Fiber TC35-12K, commercially available from Formosa Plastics Corporation) were impregnated in the shear thickening formulation in Example 7. 8 sets of the impregnated carbon fiber layers were alternately stacked (0°/90°/0°/90° . . . ). The stack was heated to 80° C. to 90° C. and pressed at 80° C. to 90° C. for 0.5 to 4.5 hours, thereby obtaining a composite film material.

Example 13

Glass fibers (Direct Roving 346, 2300±230 tex, commercially available from Taiwan glass Industry Corporation) were impregnated in the shear thickening formulation in Example 7. 4 sets of the impregnated glass fiber layers were alternately stacked) (0°/90°/0°/90°. The stack was heated to 80° C. to 90° C. and pressed at 80° C. to 90° C. for 0.5 to 4.5 hours, thereby obtaining a composite film material.

Example 14

Polyamide fibers (Twaron 2000, 1680 dtex, commercially available from Teijin Aramid Co., Ltd.) were impregnated in the shear thickening formulation in Example 7. 8 sets of the impregnated polyamide fiber layers were alternately stacked (0°/90°/0°/90° . . . ). The stack was heated to 80° C. to 90° C. and pressed at 80° C. to 90° C. for 0.5 to 4.5 hours, thereby obtaining a composite film material.

Comparative Examples 3 and 4

Similar to Example 12, and the differences in Comparative Examples 3 and 4 were the carbon fibers being changed to steel plate (Thickness of 1.0 mm, commercially available from SHIN SHING CHIKUNG CO., LTD.) and six carbon fiber cross woven fabrics (G13-DB0301B, 3K carbon yarn, commercially available from HOMYTECH CO., LTD), respectively.

Comparative Example 5

No composite film material was used, which served as a control group of the impact test.

[Impact Test]

Subsequently, Comparative Example 5 and the composite film materials in Examples 12 to 14 and Comparative Examples 3 to 4 were checked by impact test. First, one face of the composite film material was adhered to clay with a thickness of 30 mm, and a steel round head (110.4 g and 14.29 cm$^3$) was disposed at another face of the composite film material, wherein the composite film material was disposed between the clay and the steel round head. The steel round head was impacted by a golf ball with a diameter of 42.67 mm and a velocity of 48 m/s, such that the composite film material was impacted by the steel round head with a velocity of 25 m/s, wherein the contact area of the steel round head and the composite film material was 0.1 to 3 cm$^2$. The sinking degrees and sinking volume of the composite film materials and the clay were then measured, as shown in Table 7.

TABLE 7

| | Composite film material thickness (mm) | Sinking depth of the composite film material (mm) | Sinking depth of the clay (mm) | Sinking volume of the clay (c.c.) |
|---|---|---|---|---|
| Example 12 | 2.38 | <0.20 | 0.30 | 1.00 |
| Example 13 | 2.02 | <0.30 | 0.35 | 1.50 |
| Example 14 | 1.28 | <0.30 | 0.30 | 1.50 |
| Comparative Example 3 | 1.03 | 5.09 | 5.11 | 4.00 |
| Comparative Example 4 | 1.74 | 0.50 | 4.36 | 3.00 |
| Comparative Example 5 | — | — | 14.26 | 15.00 |

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A shear thickening formulation, comprising:
   inorganic particles;
   polyethylene glycol, wherein the inorganic particles and the polyethylene glycol have a weight ratio of 3:1 to 4:1, the inorganic particles comprise silicon oxide, aluminum oxide, silicon carbide, nanodiamond, or a combination thereof; and
   a filler, wherein the inorganic particles and the filler have a weight ratio of 10:1 to 100:1,
   wherein the polyethylene glycol comprises a first polyethylene glycol and a second polyethylene glycol, the first polyethylene glycol has a weight average molecular weight of 100 to 400, and the second polyethylene glycol has a weight average molecular weight of 600 to 2000, and
   wherein the nanodiamond has a diameter of 200 nm to 5000 nm.

2. The shear thickening formulation as claimed in claim 1, wherein the filler comprises nanoclay, nanocellulose, or a combination thereof, wherein the nanoclay has a diameter of 10 nm to 50 nm and a thickness of 0.1 nm to 2 nm, the nanocellulose has a diameter of 1 nm to 200 nm and a length of 0.01 μm to 100 μm.

3. The shear thickening formulation as claimed in claim 1, wherein the first ethylene glycol and the second ethylene glycol have a weight ratio of 1:1 to 3:1.

4. A composite material, comprising:
   a matrix; and
   the shear thickening formulation as claimed in claim 1.

5. The composite material as claimed in claim 4, wherein the shear thickening formulation is disposed on a surface of the matrix or in the matrix.

6. The composite material as claimed in claim 4, wherein the filler comprises nanoclay, nanocellulose, or a combination thereof, wherein the nanoclay has a diameter of 10 nm to 50 nm and a thickness of 0.1 nm to 2 nm, the nanocellulose has a diameter of 1 nm to 200 nm and a length of 0.01 μm to 100 μm.

\* \* \* \* \*